(12) United States Patent
Auman

(10) Patent No.: US 6,908,577 B2
(45) Date of Patent: *Jun. 21, 2005

(54) PROCESS FOR MANUFACTURING A CAPITAL FOR AN ARCHITECTURAL COLUMN

(76) Inventor: Barney J. Auman, 20 Canyon Cove, Logan, UT (US) 84321

( * ) Notice: Subject to any disclaimer, the term of this patent is extended or adjusted under 35 U.S.C. 154(b) by 80 days.

This patent is subject to a terminal disclaimer.

(21) Appl. No.: 09/895,612

(22) Filed: Jun. 29, 2001

(65) Prior Publication Data

US 2002/0175437 A1 Nov. 28, 2002

Related U.S. Application Data

(63) Continuation-in-part of application No. 09/862,893, filed on May 22, 2001, now Pat. No. 6,579,481.

(51) Int. Cl.$^7$ .......................... B29C 41/04; B29C 44/06
(52) U.S. Cl. ...................... 264/45.7; 264/255; 264/276; 264/311; 264/338
(58) Field of Search .............................. 264/276, 45.7, 264/255, 311, 338

(56) References Cited

U.S. PATENT DOCUMENTS

| | | | | |
|---|---|---|---|---|
| 4,183,883 A | * | 1/1980 | Blair | 264/255 |
| 5,253,460 A | * | 10/1993 | Simenoff | 52/252 |
| 5,568,709 A | * | 10/1996 | Steckler | 52/309.8 |
| 5,605,023 A | * | 2/1997 | Biernazki | 52/301 |
| 5,819,485 A | * | 10/1998 | Lane et al. | 52/287.1 |
| 6,060,006 A | * | 5/2000 | Savenok | 264/45.7 |
| 6,579,481 B2 | * | 6/2003 | Auman | 264/45.7 |

* cited by examiner

*Primary Examiner*—Allan R. Kuhns
(74) *Attorney, Agent, or Firm*—Fehr Law Firm; Thompson E. Fehr

(57) ABSTRACT

A process for manufacturing a capital for an architectural column. The inside of a mold for an architectural column is lightly coated with a mold release. A first opening of the mold is placed upon a surface, and a plug is positioned on the surface within the first opening. Through another opening foam is poured around the plug. After the foam has hardened, the mold is removed from the surface. All other openings in the mold are securely covered. Then an elastomer is introduced into the mold, and the mold is rotated about multiple different axes. The introduction of the elastomer is repeated after the prior coating created by the introduced elastomer has become tacky but before the prior coating has become firm. After the final coating of elastomer has become tacky but not firm, foam is introduced into the mold.

1 Claim, 2 Drawing Sheets

PROCESS FOR MANUFACTURING A CAPITAL FOR AN ARCHITECTURAL COLUMN

CROSS-REFERENCE TO RELATED APPLICATION

This is a continuation-in-part of previously U.S. application Ser. No. 09/862,893, filed on May 22, 2001, which has now issued as U.S. Pat. No. 6,579,481.

BACKGROUND OF THE INVENTION

1. Field of the Invention

This invention relates to a process for manufacturing a capital for an architectural column using rotation of a mold into which a foam and an elastomer have been placed. As used throughout this document, the term "elastomer" is meant also to include a "resin"; and the term "foam" includes any liquid that will expand and create a lightweight filler.

2. Description of the Related Art

The inventor is unaware of any patents concerning the making of an architectural structure through the rotation of a mold into which a foam-elastomer has been placed.

Capitals for architectural columns are traditionally made from a variety of materials, ranging from cement and plaster to fiberglass and resins. The processes by which capitals are manufactured utilizing such materials, however, often consume considerable time and are otherwise inefficient. Moreover, capitals made from traditional materials tend to be heavy, brittle, and prone to warping.

It is assumed by the inventor that capitals have not been made from elastomers or both foam and elastomers because of the difficulty that has been experienced in working with elastomers and foam.

SUMMARY OF THE INVENTION

Elastomers are placed inside a mold that is rotated about multiple different axes, preferably but not necessarily, two orthogonal axes to assure that the elastomers cover the entire inside surface of the mold. Several different coatings of elastomers are utilized.

Elastomers are utilized to give strength to the capital. However, to minimize weight while reducing the tendency of a hollow capital to warp, the space inside the elastomers is filled with foam.

Rotation of the mold can be accomplished in any manner but is preferably done with a machine.

DESCRIPTION OF THE PREFERRED EMBODIMENT

Figure 1:
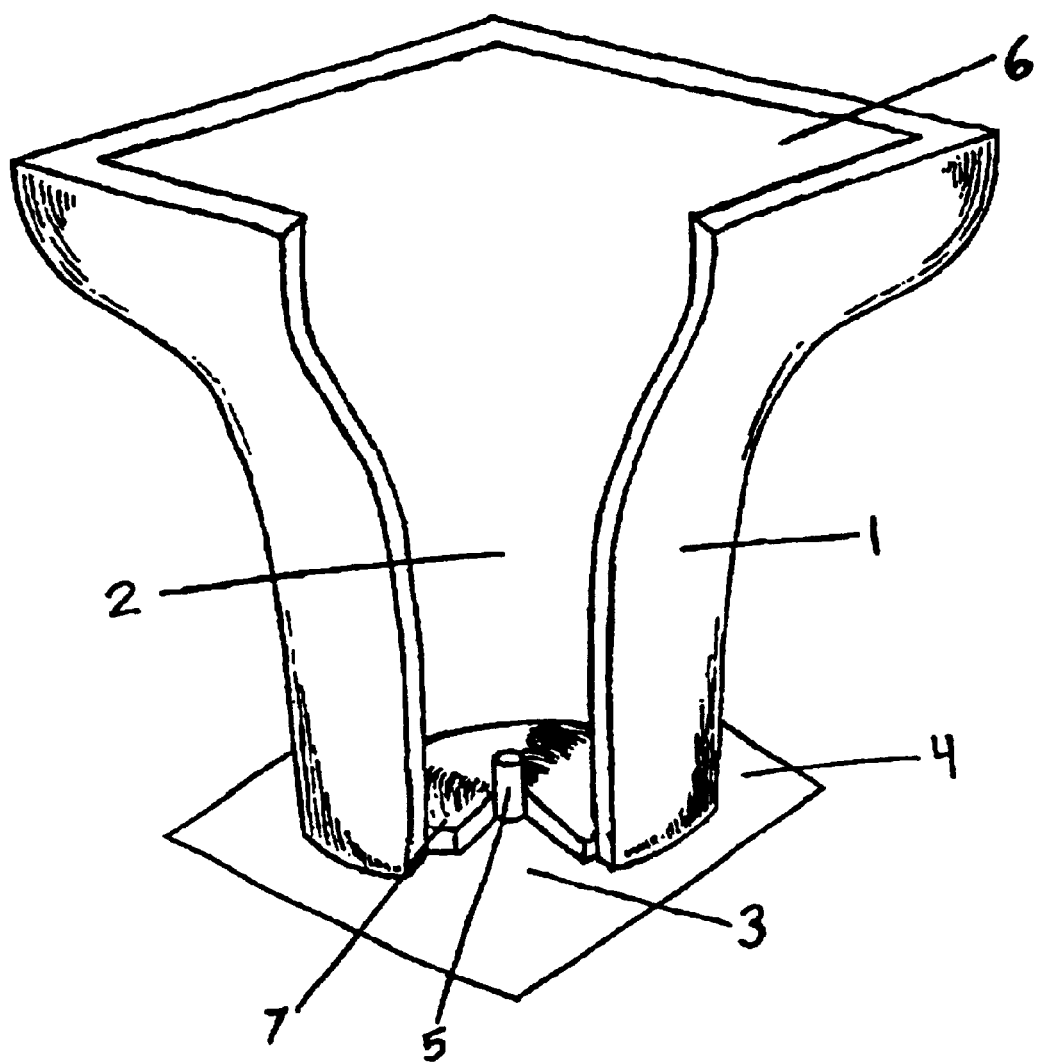
FIG. 1 depicts a cutaway view of a mold that is used to create the capital with the process of the present invention.

A capital mold 1 is first coated with a mold release. The inside 2 of the mold 1, i.e., everywhere the elastomer will eventually touch is lightly coated with a mold release. Any mold release that is traditionally used may be utilized. Aerosol mold release is preferred. One aerosol mold release is manufactured by Sherwin-Williams Diversified Brands, Inc. of Bedford Heights, Ohio.

Optionally and preferably, either before or after—but preferably after—the mold release has dried, the mold release is coated with a clear aerosol spray enamel to give the resultant capital a glossy shine.

A first opening 3 of the mold 1 is placed upon a surface 4, preferably but not necessarily, a flat surface 4 that has been coated with mold release.

Either before or after placing the mold 1 upon the surface 4, a plug 5 is positioned on the surface 4 where the first opening 3 is or will be located. The plug 5 is preferably silicon rubber because such a substance does not have to be coated with mold release in order for the plug 5 to be removed. Any other material can, however, be used for the plug as long as such material is coated with mold release. If positioning of the plug 5 occurs after the mold 1 has been placed upon the surface 4, positioning must be done through another opening 6.

Through another opening 6 in the mold 1 foam 7 is poured around the plug 5 to a level that is less than the thickness of the mold 1 and preferably, but not necessarily, less than the height of the plug 5. The foam 7 must completely seal the first opening 3 except where the plug 5 is located. If the foam 7 covers the plug 5, the subsequently hardened foam 7 must be removed above the plug 5 in order to assure that the first opening 3 is not blocked. Such removal can be by cutting, drilling, or any other technique that will create a hole 8 through the hardened foam 7.

After the foam 7 has hardened, the mold 1 is removed from the surface 4.

All other openings 5 (one or more) in the mold 1 must be securely covered. The plug 5 is removed from the first opening 3.

Then an elastomer is introduced into the mold 1 and the mold 1 is rotated about multiple different axes, preferably but not necessarily, two orthogonal axes. Introduction of the elastomer may occur either before or after rotation of the mold 1 commences.

The plug 5 is then replaced in the first opening 3.

The introduction of the elastomer is repeated after the prior coating created by the elastomer has become tacky, i.e., viscous, but before the prior coating has become firm. This enables both coatings to produce a single generally uniform layer. Four introductions of elastomer and four resultant coatings is preferred but not essential.

After the final coating of elastomer has become tacky but not firm, foam 7 is introduced into the mold 1. It is preferable, but not essential, that the foam 7 be a member of the polyurethane family. This would include, but not be limited to, a blend of polyester and polyether.

Periodically the plug 5 is removed to reduce pressure as the foam solidifies. A preferred, but not essential, period is thirty seconds.

The quantity of foam 7 selected is such that it will not leak from the mold 1 when the plug 5 is removed if the plug 5 is near a vertical position.

Once the foam 7 has ceased to expand, rotation is stopped, the plug 5 is removed, the mold 1 is oriented to place the first opening 3 is placed near the top of the mold 1 (to such an extent that subsequently introduced foam 7 will not spill in the liquid state from the first opening 3), and the requisite amount of foam 7 necessary to fill any remaining void within the mold 1 is introduced.

Multiple introductions of elastomer are necessary to prevent the elastomer from simply coalescing near the center of the mold. This phenomenon does not occur with the foam 7; so, there can be either single or multiple introductions of the foam 7.

Figure 2:
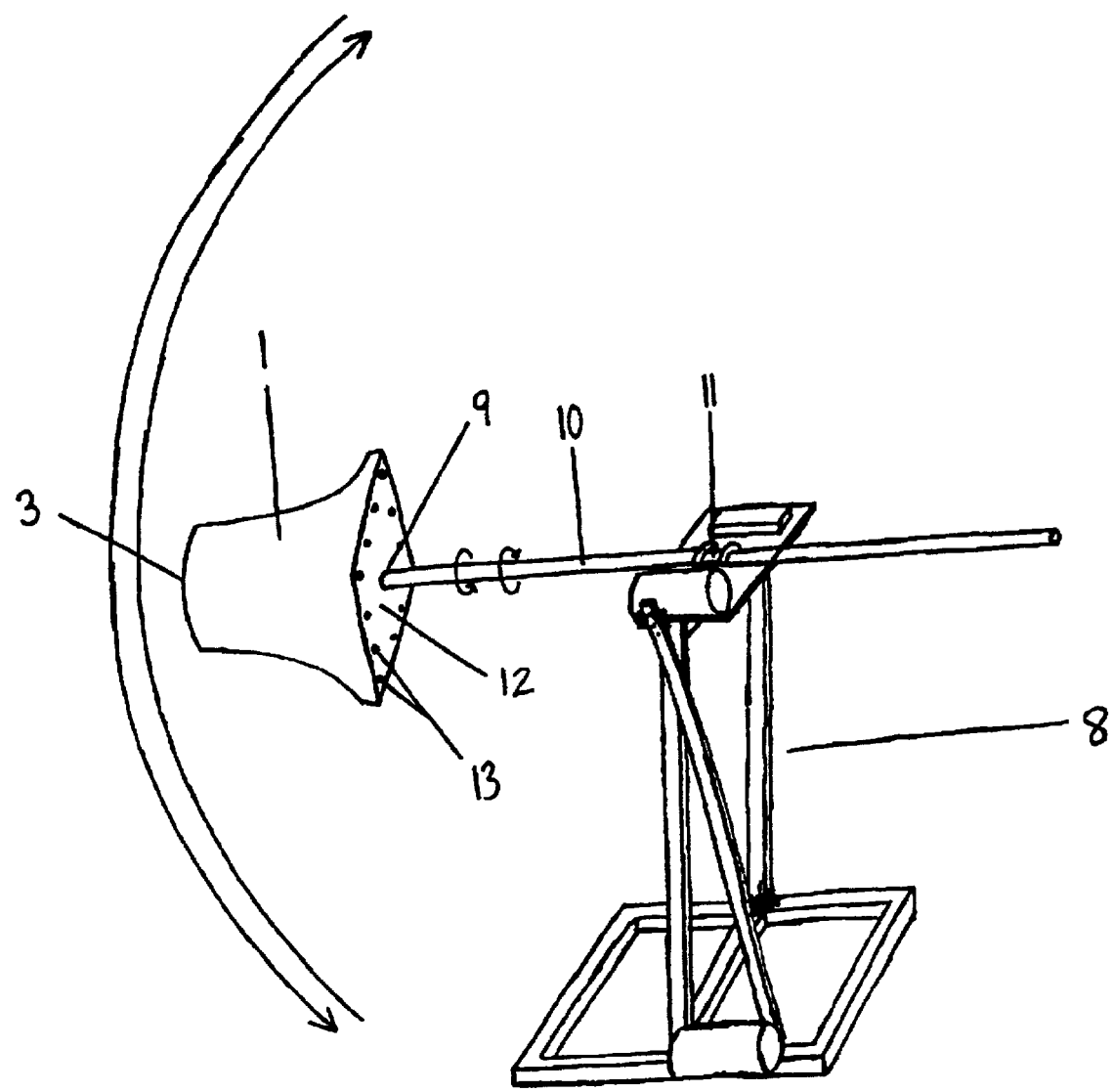
FIG. 2 illustrates a machine that is used as one way of rotating the mold during the process of creating the capital.

Rotation is preferably accomplished with the machine 8 shown in FIG. 2. A first end 9 of shaft 10 is releasably attached to the mold 1. The shaft 9 is preferably, but not necessarily made of stainless steel. A second end 11 of the shaft 10 is releasably attached to the machine 8. If any portion of the shaft 9 or the mechanism for attaching the shaft 10 (preferably, but not necessarily a plate 12 and bolts 13) will cover another opening 6, such portion must be coated with mold release.

I claim:

1. A process for manufacturing a capital for an architectural column, which comprises:

lightly coating the inside of a mold having a first opening and one or more other openings with mold release;

placing the first opening of the mold upon a surface that has been coated with mold release;

either before or after placing the first opening of the mold upon a surface that has been coated with mold release, positioning a plug where the first opening is or will be located on the surface;

through another opening in the mold pouring foam around the plug to a level that is less than the thickness of the mold;

after the foam has hardened, removing the mold from the surface;

securely covering all other openings in the mold;

introducing an elastomer into the mold;

commencing rotation of the mold about two orthogonal axes either before or after introduction of the elastomer;

replacing the plug in the first opening;

after the coating formed by the prior introduction of the elastomer has become tacky but before such coating has become firm, the introduction of the elastomer is repeated one or more times; and after the final coating formed by the introduction of the elastomer has become tacky but not firm, foam is introduced into the mold.

* * * * *